United States Patent
Calvente et al.

(10) Patent No.: US 12,526,047 B2
(45) Date of Patent: Jan. 13, 2026

(54) METHOD AND APPARATUS FOR HANDOVER CONTROL IN AN OPTICAL WIRELESS COMMUNICATION NETWORK

(71) Applicant: SIGNIFY HOLDING B.V., Eindhoven (NL)

(72) Inventors: Francisco David Rojas Calvente, Eindhoven (NL); Christian Jordan, Venlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 208 days.

(21) Appl. No.: 18/026,748

(22) PCT Filed: Sep. 10, 2021

(86) PCT No.: PCT/EP2021/074975
§ 371 (c)(1),
(2) Date: Mar. 16, 2023

(87) PCT Pub. No.: WO2022/063611
PCT Pub. Date: Mar. 31, 2022

(65) Prior Publication Data
US 2023/0353240 A1    Nov. 2, 2023

(30) Foreign Application Priority Data

Sep. 24, 2020  (EP) ...................................... 20198004

(51) Int. Cl.
*H04B 10/114*    (2013.01)
*H04B 10/116*    (2013.01)

(52) U.S. Cl.
CPC ....... *H04B 10/1149* (2013.01); *H04B 10/116* (2013.01)

(58) Field of Classification Search
CPC .......................... H04B 10/1149; H04B 10/116
See application file for complete search history.

(56) References Cited

U.S. PATENT DOCUMENTS

| 8,855,080 | B2 | 10/2014 | Chen | |
|---|---|---|---|---|
| 10,893,451 | B2* | 1/2021 | Wang | ..................... H04W 24/10 |
| 2015/0373610 | A1* | 12/2015 | Zhi | .................... H04W 36/0016 398/128 |
| 2016/0157248 | A1 | 6/2016 | Lin et al. | |
| 2017/0265112 | A1* | 9/2017 | Morita | .............. H04W 36/0077 |
| 2019/0028193 | A1* | 1/2019 | Miras | ................. H04B 10/1149 |
| 2019/0238227 | A1* | 8/2019 | Bottari | ............... H04B 10/1141 |
| 2020/0092002 | A1* | 3/2020 | Islim | ................... H04B 10/116 |

(Continued)

OTHER PUBLICATIONS

Nilesh Khambekar et al., "Utilizing OFDM Guard Interval for Spectrum Sensing", IEEE Xplore, p. 35-42.

(Continued)

*Primary Examiner* — Pranesh K Barua

(57) ABSTRACT

In optical wireless communication networks (e.g. LiFi networks), comprised of multiple access points (201, 202), APs, a mechanism is provided for seamless handover between two overlapped neighboring APs, wherein a sectorized endpoint (209) is configured to exploit knowledge of channel turnaround to detect the presence of neighboring AP(s) in an efficient manner and select a relevant segment (PD1, PD2, PD3, PD4) for handover.

20 Claims, 6 Drawing Sheets

(56) References Cited

U.S. PATENT DOCUMENTS

2024/0283535 A1* 8/2024 Wei .................. H04B 10/116

OTHER PUBLICATIONS

Minh, H L et al., "Bidirectional gigabit ethernet optical wireless communications system for home access networks", IET Communications, The Institute of Engineering and Technology, GB, vol. 6, No. 11, Jul. 24, 2012 (Jul. 24, 2012), pp. 1529-1536, XP006039517, ISSN: 1751-8628, DOI: 10.1049/IET-COM.2011.0322.

Zeng Zhihong et al., "Access Point Selection Scheme for LiFi Cellular Networks using Angle Diversity Receivers", 2019 IEEE Wireless Communications and Networking Conference (WCNC) IEEE, Apr. 15, 2019 (Apr. 15, 2019), pp. 1-6, XP033652092, DOI: 10.1109/WCNC.2019/WCNC.2019.8885720.

Eldeeb Hossien B et al., "Interference mitigation and capacity enhancement using constraint-field of view ADR in downlink VLC channel", IET Communications, The Institution of Engineering and Technology, GB, vol. 12, No. 16, Oct. 9, 2018 (Oct. 9, 2018), pp. 1968-1978, XP006069637, issn: 1751-8628, DOI: 10.1049/IET-COM.2017.1174.

* cited by examiner

METHOD AND APPARATUS FOR HANDOVER CONTROL IN AN OPTICAL WIRELESS COMMUNICATION NETWORK

CROSS-REFERENCE TO PRIOR APPLICATIONS

This application is the U.S. National Phase application under 35 U.S.C. § 371 of International Application No. PCT/EP2021/074975, filed on Sep. 10, 2021, which claims the benefit of European Patent Application No. 20198004.2, filed on Sep. 24, 2020. These applications are hereby incorporated by reference herein.

FIELD OF THE INVENTION

The invention relates to the field of communication in optical wireless networks, such as—but not limited to—LiFi networks, for use in various different applications for home, office, retail, hospitality and industry.

BACKGROUND OF THE INVENTION

Optical wireless networks, such as Light Fidelity (LiFi) networks (named like WiFi networks), enable mobile/stationary user devices (called endpoints (EP) in the following) like laptops, tablets, smartphones or the like to connect wirelessly to the internet. WiFi achieves this using radio frequencies, but LiFi achieves this using the visible and non-visible light spectrum (including ultraviolet (UV) and infrared (IR) light) which can enable unprecedent-ed data transfer speed and bandwidth. Furthermore, it can be used in areas susceptible to electromagnetic interference. More specifically, LiFi refers to techniques whereby information is communicated in the form of a signal embedded in light (including for example visible light, or infrared light) emitted by a light source. Depending for example on the particular wavelengths used, such techniques may also be referred to as coded light, optical wireless communications (OWC), visible light communication (VLC) or free-space optical communication (FSO).

Based on modulations, information in the coded light can be detected using any suitable light sensor or photodetector. This can be a dedicated photocell (point detector), an array of photocells possibly with a lens, reflector, diffuser or phosphor converter, or a camera comprising an array of photocells (pixels) and a lens for forming an image on the array. E.g., the photodetector may be a dedicated photocell included in a dongle which plugs into the endpoint a dedicated light sensor integrated in the endpoint, a general purpose (visible or infrared light) camera of the endpoint, or an infrared detector initially designed for instance for 3D face recognition having a dual-use. Either way this may enable an application running on the endpoint to receive data via the light.

A communication signal can be embedded in a modulated light signal emitted by an illumination source of an access device, such as an everyday luminaire, e.g. room lighting or outdoor lighting, thus allowing use of the illumination from the luminaires as a carrier of information. The modulated light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination. Alternatively, a modulated light signal may be emitted by a dedicated access point having a primary communication function and possibly no second function. As already mentioned above, such communication signals may also utilize modulated light signals outside the visible spectrum. Outside the visible spectrum in particular the IR or UV range are interesting candidates as these are not visible and thus do not cause visible artefacts; which may be particularly relevant for transmissions originating from handheld devices.

"Bidirectional gigabit ethernet optical wireless communication system for home access networks", by Minh H. L. et al, published in IET Communications, vol. 6, no. 11, 24 Jul. 2012, discloses a Line-of-Sight optical wireless communication system, that utilizes angle-diversity transceivers that enable discrete beam-steering. Each transceiver uses three transmitting and receiving elements. The base station in the system switches on all transmitters and these transmit the same data in order to provide coverage for multiple users. The receiver elements in turn are continuously monitored for a received signal strength indicator being greater than a pre-defined threshold and the receiver is configured to use the receiver elements on a 'select good enough' basis, that is to use the first receiver element for which the signal strength exceeds the threshold.

In the present disclosure, the term "access point" (AP) is used to designate a logical access device that can be connected to one or more physical access devices (e.g. transceivers). The logical access device may comprise a MAC (Media Access Control) protocol and modulator/demodulator (MODEM) functionality. This means that the physical access devices can be regarded as "optical antenna's", or optical-electrical converters with associated electronics. Such physical access devices may typically be located at a luminaire and the logical access point may be connected to one or more physical access devices each located at one or more luminaires.

Communication devices for optical wireless networks are being developed to have large area coverage for indoor environments with high speed and low cost. To cover large areas such an open-space office, multiple APs need to be used. These APs will have areas of overlap between them, generating interference. An EP, e.g., LiFi-enabled computer or mobile device, needs to be able to transition seamlessly between two different AP domains.

SUMMARY OF THE INVENTION

It is an object of the present invention to assist in solving handover and/or interference issues between two neighboring APs of an optical wireless network in an effective way, e.g., by keeping the number of hardware elements low.

This object is achieved by an End Point, EP, device as claimed in claim 1, by an Optical Wireless Communication, OWC, system as claimed in claim 12, and by a method as claimed in claim 13.

According to a first aspect, an apparatus is provided for controlling an optical wireless transceiver comprising a plurality of photodetectors having different respective fields of view for reception of modulated light signals, wherein the apparatus is configured to:
detect a transmission interruption time;
initiate a testing of the plurality of photodetectors during the transmission interruption time to determine whether one of the plurality of photodetectors is receiving a modulated light signal with a signal strength above a threshold signal strength; and
if a tested photodetector is determined to have received the modulated light signal with a signal strength above the threshold signal strength, switch reception to the tested photodetector.

According to a second aspect, a method is provided for controlling an optical wireless transceiver comprising a plurality of photodetectors having a different respective fields of view for reception of modulated light signals,
wherein the method comprises:
detecting a transmission interruption time;
testing the plurality of photodetectors during the transmission interruption time to determine whether one of the plurality of photodetectors is receiving a modulated light signal with a signal strength above a threshold signal strength; and
if a tested photodetector is determined to have received the modulated light signal with a signal strength above the threshold signal strength, switching reception to the tested photodetector.

Accordingly, a transmission interruption time (e.g. an inter-frame gap)) used in time-multiplexed systems between transmission and reception is used to detect other network nodes (e.g. neighboring APs) using the sectorized receiver, in particular when the other network nodes are not synchronized with the sensing device. Based on this detection or sensing, it is possible to assist in selecting candidates for handovers without the need for sacrificing channel time (e.g. without loosing transmission frames) and without requiring substantial hardware modifications. Preferably, the transmission interruption time corresponds to a time interval in an OWC network cell wherein the AP and the EPs associated to that AP are not transmitting.

There may also be other EPs associated to a neighboring AP not connected to a concerned EP. What the concerned EP detects can be a beacon or a regular downlink data frame from the neighboring AP to the other associated EPs. Both types of signals can be used for measuring the signal strength during the transmission interruption time.

Optionally, the transmission interruption time from a receiver point of view may correspond to the time interval as defined by the network protocol between the last symbol of the last received frame over the air interface and the first symbol of a transmitted response frame. In many networks, transmission interruption time(s) are required for operation of the wireless interfaces of wireless nodes. The transmission interruption time may be used for example, to provide margin for allowing a receiver to process the last message and to prepare an acknowledgement in case of an acknowledged protocol.

In an ITU G.vlc network, the inter-frame gap time represents an example of a transmission interruption time. The transmission interruption time may be a time prescribed by the physical layer (PHY) and/or Medium Access Control (MAC) layer. Alternatively, in IEEE 802.11 networks, the short interframe spacing prior to transmission of an acknowledgment, a clear-to-send (CTS) frame, a block ack frame that is an immediate response to either a block ack request frame or an aggregated MAC protocol data unit (A-MPDU), the second or subsequent MPDU of a fragment burst, a station responding to any polling by a point coordination function and during contention free periods of the point coordination function. A Short Interframe Space (SIFS) in 802.11 was introduced to accommodate for a delay in the (OWC) receiver, a Physical Layer Convergence Protocol (PLCP) delay and a MAC processing delay in practical implementations.

Thus, the transmission interruption time is provided to allow enough time for the receiver to interpret the frame, switch to transmitter mode (if needed) and start transmitting the response. When the time interval is defined by the network protocol, its minimum duration is known apriori and to the device that last transmitted can start sensing during that period and in practice it may be possible to sense even longer, e.g. when there is no traffic.

According to a first option of the first or second aspect, the reception may be switched to the tested photodetector to thereby initiate a handover from a first access point to a second access point. Thereby, handover can be achieved in an effective, simple and fast manner by switching reception to another field of view with better signal strength or quality during the transmission interruption time.

According to a second option of the first or second aspect, which may be combined with the first option, a measurement of a signal quality parameter during the transmission interruption interval can be used to determined whether one of the plurality of photodetectors is receiving the modulated light signal with a signal strength above the threshold signal strength. Thus, the criteria for selecting another photodetector with different field of view can be readily implemented based on common signal quality parameters.

According to a third option of the first or second aspect, which may be combined with the first or second option, reception may be switched to the tested photodetector while other photodetectors of the plurality of photodetectors are switched off. Thereby, interference among different ones of the plurality of photodetectors can be prevented.

According to a fourth option of the first or second aspect, which may be combined with any one of the first to third options, testing of the plurality of photodetectors may be initiated in a predetermined or random sequence. Thereby, a single signal detector can be used for the required measurements by selectively connecting outputs of the phasedetectors to the signal detector in accordance with the predetermined or random sequence.

According to a fifth option of the first or second aspect, which may be combined with any one of the first to fourth options, the transmission interruption time may be detected based on a control output used to signal to a front-end stage of the transceiver when a transmitting circuit is transmitting. Thus, a control output available at the transceiver can be used to control the intermittent testing process to thereby keep hardware requirements low.

According to a sixth option of the first or second aspect, which may be combined with any one of the first to fifth options, the testing of the plurality of photodetectors may be initiated in response to an input from a motion sensor. Thereby, the intermittent testing process can be limited to situations where the positional relation between the sectorized receiver and potential handover candidates has changed due to a detected motion of the mobile communication end (e.g. endpoint).

According to a seventh option of the first or second aspect, the transmission interruption time may be determined by a networking protocol used by the optical wireless transceiver.

According to a third aspect, a network device of an optical wireless communication network is provided, the network device comprising an apparatus according to the first aspect or any one of the first to fifth options. The network device may be an end point.

According to a first option of the third aspect, which may be combined with the first or second aspect or any one of the first to fifth options of the first or second aspect, the network device may further comprise a signal detector configured to selectively receive output signals from the plurality of photodetectors via a plurality of switches for performing signal strength and/or quality measurements based on the received output signals. Thereby, hardware requirements can be reduced, since only one signal detector can be used for the measurement process.

According to a second option of the third aspect, which may be combined with the first option or the first or second aspect or any one of the first to fifth options of the first or second aspect, the plurality of switches may be configured to be selectively controllable to switch reception to the tested photodetector. Thus, handover control can be implemented by providing a simple switch arrangement for selecting another field of view which provides a better optical connection.

According to a fourth aspect, a system is provided, that comprises at least one network device according to the third aspect.

According to a fifth aspect, a computer program product is provided, which comprises code means for producing the steps of the above method of the second aspect when run on a controller device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the network device of claim 9, the system of claim 12, the method of claim 13 and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described based on an optical multi-cell illumination and communication (LiFi) system.

Throughout the following, a luminaire as an AP is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics based with the light source coupling in light in the fiber core or "light pipe" and coupling out the light at the other end.

Although access points for optical wireless communication may be integrated with luminaires, they can also be "standalone" OWC access point devices and may optionally be co-located with radio (RF) based, e.g. WiFi access points or be combined devices that can be used for both radio (e.g. WiFi) and LiFi thereby providing both high-speed line-of-sight access as well as convenient more omnidirectional wide-range access.

A network of OWC devices may operate in a full-duplex mode, whereby an OWC AP can simultaneously communicate over an uplink and a downlink. Most of the current OWC APs however operate in half-duplex mode, whereby the AP is either transmitting (downlink), receiving (uplink) or idle. The present invention is particularly targeting OWC systems of the latter type.

Figure 1:
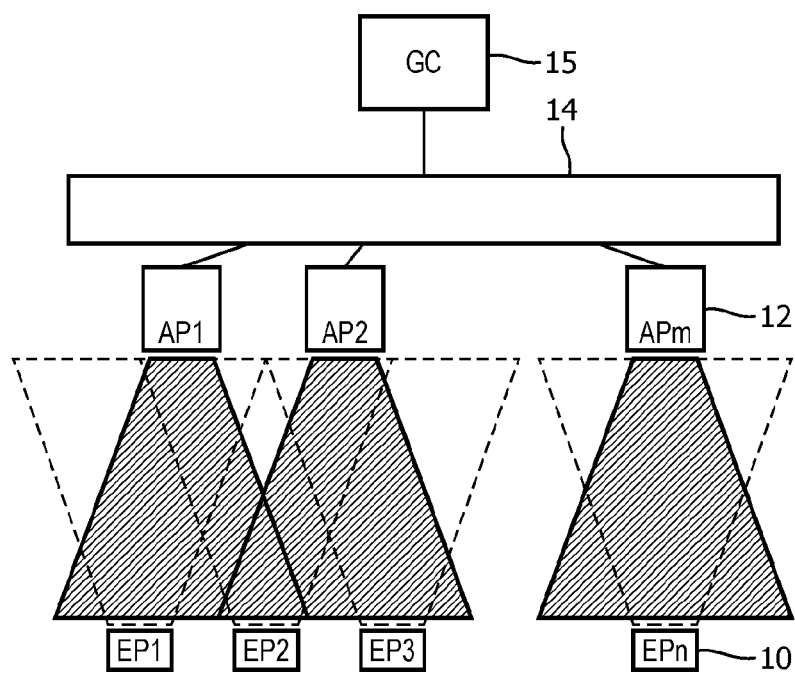
FIG. 1 shows schematically a block diagram of a LiFi network in which various embodiments can be implemented.

FIG. 1 shows schematically a block diagram of a LiFi network in which various embodiments can be implemented.

It is noted that-throughout the present disclosure—the structure and/or function of blocks with identical reference numbers that have been described before are not described again, unless an additional specific functionality is involved. Moreover, only those structural elements and functions are shown, which are useful to understand the embodiments. Other structural elements and functions are omitted for brevity reasons.

The LiFi network comprises multiple APs (AP1, AP2, . . . APm) 12, e.g. luminaires of a lighting system, connected to a backbone network (e.g. Ethernet or the like) 14 e.g. via a switch (e.g. an Ethernet switch, not shown), whereby each AP 12 comprises one or multiple transceivers (not shown) (i.e. combined transmitters (optical emitters) and receivers (light sensors)) for optical communication towards EPs (EP1, EP2, . . . EPn) 10, e.g., mobile user devices. Each of the EPs 10 is registered to an AP 12. Respective downlink light beams generated by the transceivers of the APs 12 and defining coverage areas on the plane(s) of the EPs 10 are indicated by hatched trapezoids in FIG. 1. Similarly, respective light beams generated by transceivers of the EPs 10 and defining coverage areas on the plane(s) of the APs 12 are indicated by non-filled dashed trapezoids in FIG. 1.

Where their coverage areas overlap (e.g. at EP2 or at AP1 and AP2 in FIG. 1), coordination of the communication between APs 12 and EPs 10 is needed to handle interference and/or provide handover control.

A central global controller entity or function (GC) 15, provided e.g. in a LiFi controller, is connected to the backbone network 14 and configured to manage the LiFi network, which includes interference handling coordination. Interference handling can be implemented by providing time division multiple access (TDMA), wherein medium access control (MAC) cycles of the APs 12 are aligned and divided into slots.

The global controller entity 15 may be connected via a switch (not shown) of the backbone network 14 to the APs 12. It may be a centralized entity as shown in FIG. 1 but may also be co-located/integrated in a single AP 12, or its functionality may be partitioned and distributed over at least some of the APs 12. Moreover, the global controller entity 15 or at least a part of its functions may be superfluous if the control mechanism of the embodiments described below is used. The TDMA scheme itself may provide multiple EPs time multiplexed access to a single AP.

In a LiFi network, modulated light is used to transmit data from a source device (e.g. an AP or an EP) to a destination device (e.g. an EP or an AP) as a series of one or more data packets. Each data packet comprises a plurality of fields providing different functions. In particular, each data packet has at least a preamble and a data portion. The data portion, sometimes referred to as the frame body, holds the actual payload data of the packet. The preamble precedes the data portion and may for example be used to synchronize the device receiving the data packet.

According to various embodiments, a sectorized receiver is used to provide a handover control function. Sectorization (or segmentation) of the receiver can be achieved by a minimum of two photodetectors (e.g. photodiodes) that provide selective reception from a different FoV (FoV). Thereby, handover and/or interference issues between two neighboring transmitters of an AP, respectively, can be solved in a cost-effective way at the reception end of an EP, respectively. The idea is that within time multiplexed communication schemes used in optical wireless communication networks, it is possible to use an inter-frame gap between transmission and reception to detect other APs using the sectorized receiver, in particular when the other APs are not synchronized with the sensing device. Based on this detection or sensing, it is possible to assist in selecting candidates for handovers without the need for sacrificing channel time.

In an embodiment, the proposed EP with handover and/or interference control function can be implemented by providing a sectorized receiver with two or more sectors with different FoV optics, at least one transimpedance amplifier (TIA), a signal strength detector, a switch per photodetector, a transmitter which can also be sectorized in the same manner, a low-power controller, e.g. a microcontroller, and a base band circuit compatible with the used communication protocol (e.g. ITU-T G.hn or G.vlc, IEEE 802.11bb or the like). If a sectorized transmitter using the same decision logic as the sectorized receiver is provided, power consumption at the EP and interference to neighboring APs to which the EP is currently not connected can be reduced.

Figure 2:
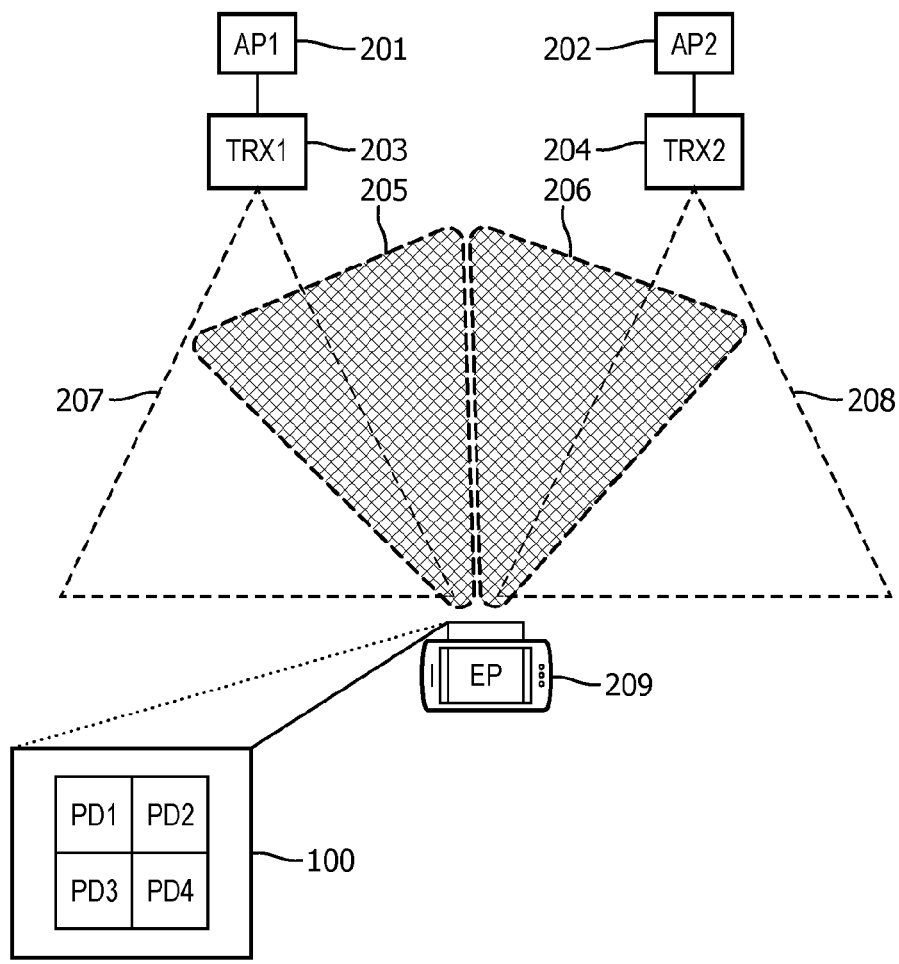
FIG. 2 shows schematically a handover situation between an EP and two different APs.

FIG. 2 shows schematically a handover situation between an EP 209 (e.g. a smartphone or tablet device) with a sectorized receiver 100 and two different APs 201, 202 (i.e. AP1 and AP2), each with an associated transceiver 203, 204 (i.e. TRX1 and TRX2).

The sectorized receiver 100 of the EP 209 comprises a plurality of photodetectors (e.g. photodiodes) PD1 to PD4 for receiving data packets as modulated light signals. Each of the photodetectors PD1 to PD4 receives signals from a different respective reception FoV. There may be some overlap between the reception FoV of one of the photodetectors and the reception FoV of one or more others of the photodetectors.

When the EP 209 is moving from a coverage area 208 that connects to AP2 202 on the right side of FIG. 2, towards a coverage area 207 that connects to AP1 201 on the left side of FIG. 2, the signal received by a second FoV 206 of the sectorized receiver 100 of the EP 209 will decrease and the signal received by a first FoV 205 of the sectorized receiver 100 of the EP 209 will increase.

The sectorized receiver 100 of the EP 209 is configured to be controlled so as to trigger a switch to AP1 201 to thereby initiate a handover from AP2 202 to AP1 201. This switching process may be controlled based on a measurement of the signal strength and/or other signal quality parameter (e.g. error rate, signal-to-noise ratio (SNR), quality of service (QoS) etc.) received by all FoVs (e.g. FoVs 205 and 206 in FIG. 2) provided by the sectorized receiver 100. As an example, the sectorized receiver 100 may be controlled and switched to a corresponding photodetector when the signal strength/quality on a particular FoV is above a threshold while switching off the other photodetectors.

Alternatively, instead of switching off the other photodetectors, it may be possible to weight both the signal from the photodetector comprising the signal from the previous AP and the signal detector from the new AP. In this manner, it is possible provide for a more gradual fade or a more abrupt switch based on the timing. A more gradual fade may be particularly useful when the EP has a role on the MAC level in the handover as it can enable a make before break handover.

The FoVs 205, 206 are illustrated as cones within the environment in FIG. 2, but it is appreciated that the rFoVs 210 may in general be of any shape or volume. There may or may not be overlap between the FoVs 205, 206 of each of the photodetectors.

The proposed handover control procedure provides the possibility of inter-domain handover and interference handling. To be able to select the correct photodetector without losing transmission frames, the characteristic of time multiplexing (e.g. time division multiple access (TDMA)) scheduling is exploited.

Optical wireless communications (e.g. LiFi communications) can be implemented using G.vlc (ITU G 9991) which is part of the G.hn family of standards. The G.hn standards are traditionally used for power line communication (PLC), coax, and phoneline communications. There are differences depending on the profile used (PLC, coax, phoneline). For example, the PLC profile requires sending two copies of each data packet. Currently, the coax implementation is generally used for LiFi. For example, a LiFi data packet may be implemented in accordance with the ITU-T Rec. G.9960 recommendation for the physical layer. In such implementations, the preamble comprises a series of repeated orthogonal frequency-division multiplex (OFDM) symbols prepended to the frame of the physical protocol layer (PHY) which are used to detect and synchronize the receiver and help it start decoding the frame. As an example, a data packet may comprise a preamble and a data portion. The data packet may comprise one or more additional portions, e.g. a header portion. Other TDMA networks where the proposed handover control procedure can be implemented are IEEE 802.11 networks (such as IEEE 802.11bb) or the like.

In such TDMA networks, a time slot is reserved for communication when an EP is registered to an AP. For each transmitted packet there is always a received packet, with an inter-frame gap (e.g. a gap of 30-40 us) between them. In FIG. 2, if the EP is connected to AP2, there cannot be any signal transmitted or received during the predefined inter-frame gaps. These inter-frame gaps thus allow to switch on to other photodetectors e.g. in a round-robin fashion and measure the signal strength of those other photodetectors during the transmission interruption time, without interfering with the communication with AP2.

As independent APs are not synchronized, there is a high probability of measuring part of a frame during the inter-frame gap time if a photodetector with a different FoV starts receiving beacons from a neighboring AP (AP1 in the case of FIG. 2).

Figure 3:
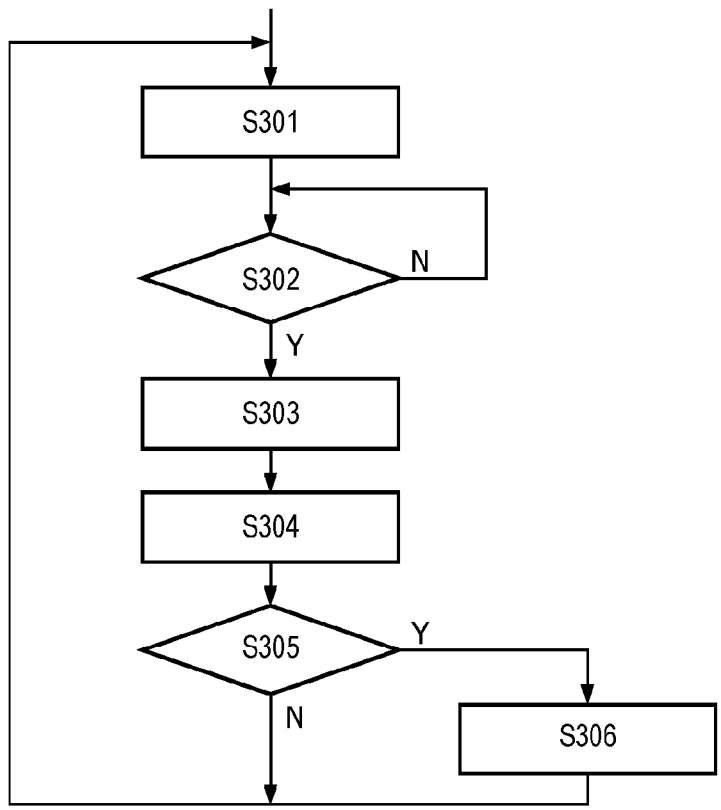
FIG. 3 shows a flow diagram of a handover control procedure according to various embodiments.

FIG. 3 shows a flow diagram of a handover control procedure according to various embodiments, which may be implemented as software routine (e.g., for controlling the controller 105 described below with reference to FIGS. 4 to 6).

In step S301, a packet is transmitted between the EP and the AP during a time slot reserved of the transmission frame reserved for communication with the AP. Then, in step S302, it is checked whether the inter-frame gap time has started. If not, the procedure repeats the checking in step S302 until the start of the transmission interruption time has been detected. If the start of the transmission interruption time has been detected in step S302, the procedure continues with step S303 and the signal detector is sequentially or successively switched to the remaining other photodetectors of the sectorized receiver for testing, e.g., to sequentially or successively measure the signal strength/quality received by the other photodetectors from their respective FoVs.

Thereafter, the procedure continues with step S304 where the measurement results are compared with a selection criteria (e.g. a threshold value which may be based on or correspond to the signal strength/quality of the active photodetector) to determine whether a more desirable (better) AP is available for handover.

In the next step S305, it is checked whether such a more desirable AP for handover has been found. If not, the procedure jumps back to step S301 where the next packet is transmitted. If an AP for handover has been determined, the procedure branches to step S306 where the photodetector that has received the signal from the more desirable AP with better signal strength/quality is switched to be used for communication.

It is noted that the procedure of FIG. 3 relates to a processing on the physical protocol layer. Once an optical path to a new AP has been selected in the EP, then it is up to the next protocol layers to receive the beacons from the AP and establish a connection (which might include security key, etc.) to complete the handover process. Thus, switching the photodetector is an immediate action during the transmission interruption time, but establishing the connection to the new AP is established thereafter. Also, there may be no message exchanges between EP and old/new AP during the transmission interruption time. The EP is either registered to one AP or another.

As discussed above the inter-frame gap (IFG) may be a "silent period", such as a guard time, also called short interframe, that is part of the OWC network protocol. This inter-frame gap is reserved to allow for a wireless interface to process a received frame and prepare the response frame.

In order to minimize overhead, such transmission interruption time is preferably defined so as to minimize overhead and to keep cost at a reasonable level and thus relatively tight. According to embodiments, this is the channel turnaround time at the OWC node that is relinquishing the channel. The OWC node that relinquishes the channel knows exactly when the channel should be silent and thus can make use of the time interval to sense incoming signals.

In a half duplex OWC network it may be possible to sense during a transmission time slot, as the photodetectors may simultaneously receive impinging light from adjacent APs even when the signal is not demodulated.

Figure 4:
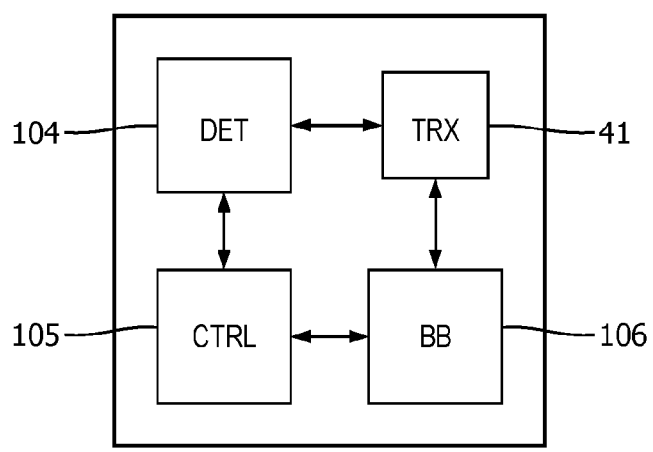
FIG. 4 shows schematically a block diagram of a network device with handover control function according to various embodiments.

FIG. 4 shows schematically a block diagram of a network device (e.g. an EP) with handover control function according to various embodiments.

It is noted again that only those blocks and/or functions are shown in FIG. 4, which are helpful to understand the present invention. Other blocks and/or functions have been omitted for brevity reasons.

The network device comprises a transceiver (TRX) 41 (i.e. a combined optical transmitter and receiver) for optical communication via an optical link of an AP-EP combination. The transceiver 41 comprises a receiver circuit and a transmitter circuit.

Furthermore, the network device comprises a signal detector (DET) 104 which can be controlled to perform signal strength and/or quality measurements based on signals received from a connected photodetector of the receiver circuit which is configured as a sectorized receiver. The signal detector 104 supplies measurement results to a controller (CTRL) 105, e.g., a software-controlled processing unit, to enable selection of connections between available photodetectors of the sectorized receiver and the baseband circuit 106 based on the measurement results of the signal detector 104. Furthermore, the controller 105 may determine inter-frame gap time for performing the measurements e.g. based on a control output of a baseband circuit (BB) 106 and may successively select connections between available photodetectors of the sectorized receiver and the signal detector 104 for measurement purposes during the transmission interruption times. The operation of the controller 105 may use a memory (not shown) in which program routines and parameters (e.g. measurement results, neighbor devices and/or other look up tables) for handover control are stored to provide a handover control procedure e.g. as explained above in connection with FIG. 3.

Optionally, the controller 105 may also be operatively coupled to the transmitter circuit.

The controller 105 may be implemented, for example, as a programmable microcontroller or a field-programmable gate array (FPGA).

In an example, the measurement functionality of the signal detector may be integrated in the controller 105 e.g. as an additional software routine, so that the measurement functionality of the signal detector 104 can be dispensed with.

In general, the sectorized receiver 100 of the EP with handover-control function may be implemented by measuring the signal strength or quality of each of its photodetectors with different FoVs by using a corresponding number of signal detectors, one for each photodetector, and deciding e.g. with the controller 105 which of a corresponding number of switches is activated to guide the signal from the selected photodetector with best signal strength or quality to a baseband circuit, depending on the position of an EP with respect to an AP or vice versa.

Figure 5:
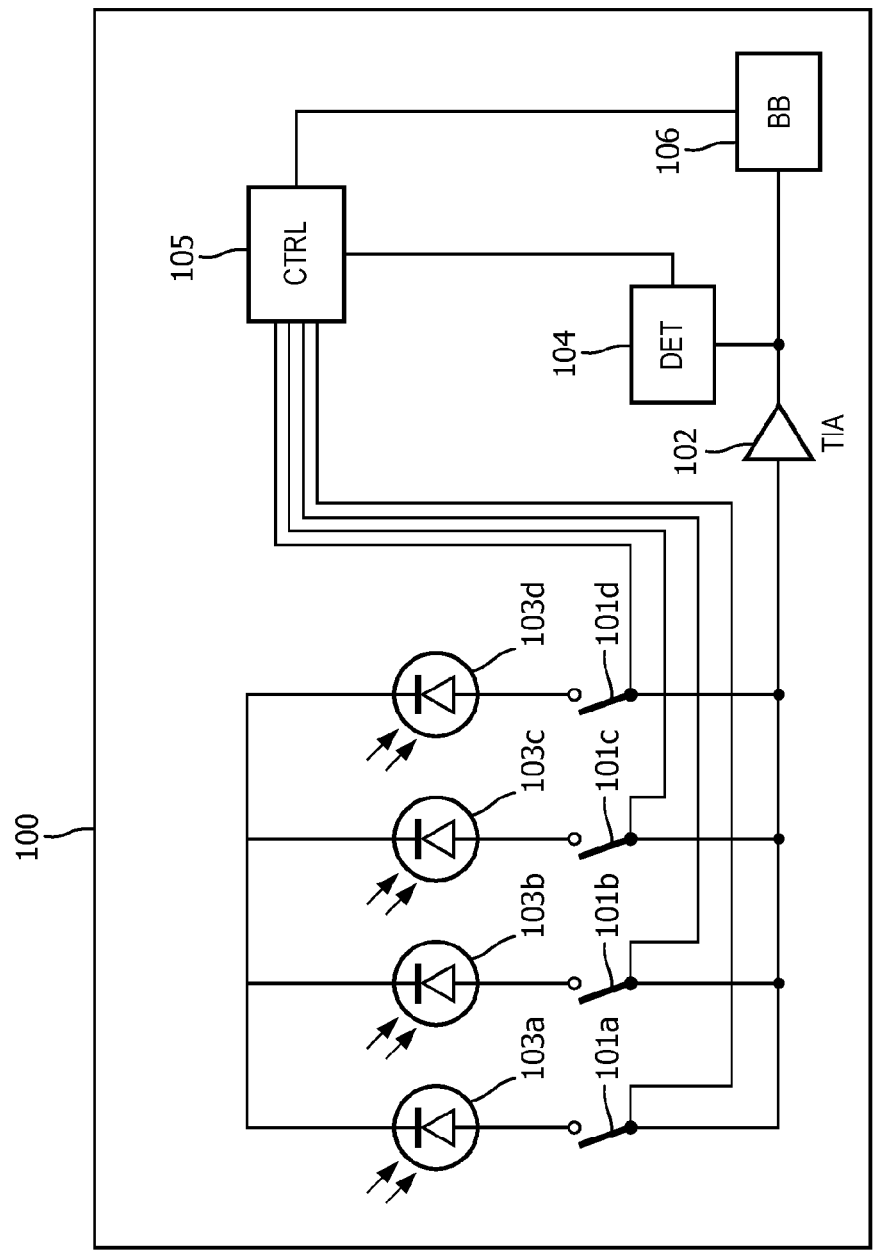
FIG. 5 shows schematically a block diagram of a first example of a sectorized receiver with handover control function according to various embodiments.

FIG. 5 shows schematically a block diagram of a first example of a more cost-efficient version of the sectorized receiver 100 of an EP with handover control function according to various embodiments.

In the first example, the sectorized receiver 100 comprises four photodetectors 103*a* to 103*d* with different FoVs. However, it is appreciated that there may be more or fewer photodetectors. In general, the sectorized receiver comprises at least two photodetectors.

A controller (CTRL) 105 is connected to a plurality of switches 101*a* to 101*d* provided between the photodetectors 103*a* to 103*d* and a TIA 102 so as to selectively activate one of the switches 101*a* to 101*d* to guide the signal from the corresponding photodetector to a baseband circuit (BB) 106, depending on the position of the EP with respect to the APs. The controller 105 performs the selection based on signal strength/quality measurement results received from a detector (DET) 104 which is connected to the output of the TIA 102. The baseband circuit 106 can be used to convert optical LiFi signals (e.g. DC-biased orthogonal frequency division multiplexing (OFDM) signals into Ethernet packets (e.g. used in the backbone network 14 of FIG. 1) and vice versa for transmission. Furthermore, the baseband circuit 106 may perform pilot-assisted channel estimation and/or frequency-domain equalization to reconstruct received symbol constellations.

To aid the controller 105 to decide when the transmission process is interrupted (e.g. during the inter-frame gap of the slots of the transmission frame), a connection line is provided between the baseband circuit 106 and the controller 105 to convey a respective control output. This control output is typically present in the baseband circuit 106 to signal to a front-end stage of a transmitter when the device is transmitting. Immediately after transmitting a packet, this control output changes its binary status (e.g. goes low) to signal to the controller 105 that it has a minimum time period (e.g. 30 us) available where it can switch to and read measurement results from other photo detectors without breaking transmission frames of the currently registered AP.

The photodetectors 103*a* to 103*d* generate an electrical current in response to light incident on the photodetector. In this way, each of the photodetectors 103*a* to 103*d* can be used to receive optical wireless communication signals (e.g. LiFi signals) in the form of modulated light.

Each of the photodetectors 103*a* to 103*d* receives light from a different respective reception FoV. For example, each of the photodetector 103*a* to 103*d* may receive light from a specific sector (over a solid angle) and may be oriented in a different direction. Alternatively or additionally, the solid angle over which one or more of the photodetectors 103*a* to 103*d* can receive light may be constrained by part of the body or housing of the transceiver thereby shaping the direction/beamshape of the emitted light beam.

Herein, the term "signal strength" refers to the AC signal strength. For example, the signal strength detection may start at 2 MHz. This is advantageous as it allows DC sources (such as sunlight) to be ignored. In some examples, an optical filter may be provided at the photodetectors 103*a* to 103*d* in order to substantially remove wavelengths of light other than those used for communication (e.g. the photodetectors may be IR photodetectors provided with a wavelength filter for substantially blocking visible light). In some examples, the photodetectors 103*a* to 103*d* may be differential, which are more immune to visible light that has no modulation (DC). In other words, the signal-to-noise ratio (SNR) or received signal strength indicator (RSSI) is based on a filtered signal, where in some examples a DC contribution is filtered out to remove e.g. sunlight, and alternative or additionally a (frequency) bandpass filter could be used to filter out noise components that are outside of the frequency range of that of the preambles.

In the example shown in FIG. 5, the sectorized receiver 100 includes a switch arrangement comprising the plurality of switches 101*a* to 101*d*. In this example, the number of switches 101*a* to 101*d* is the same as the number of photodetectors 103*a* to 103*d* such that there is a respective switch for each photodetector.

The controller 105 is operatively coupled to each of the photodetector switches 101*a* to 101*d* to independently control opening and closing of the switches 101*a* to 101*d*. Each of the switches 101*a* to 101*d* is operatively coupled to one of the photodetectors 103*a* to 103*d*. The photodetectors 103*a* to 103*d* are each operatively coupled to the TIA 102. The signal detector 104 is operatively coupled to the TIA 102.

Whether or not current generated by a particular one of the photodetectors 103*a* to 103*d* reaches the TIA 102 depends on the state of the respective one of the switches 101*a* to 101*d*, i.e., when the respective switch for a given photodetector is closed (not passing electrical current), any current generated by that photodetector is not passed to the TIA 102, and when the respective switch for a given photodetector is open (passing electrical current), current generated by that photodetector is passed to the TIA 102.

In operation, the controller 105 is configured to control the switches 101*a* to 101*d* so that the photodetectors 103*a* to 103*d* can be selectively tested during reception of an optical signal (e.g. a beacon from other AP(s) not connected to the EP) in order to determine whether at least one of the photodetector 103*a* to 103*d* is receiving an optical signal with a signal strength greater than a threshold signal strength. To achieve this, the controller 105 is configured to operate the switches 101*a* to 101*d* in order to selectively connect a single one of the photodetectors 101*a* to 101*d* to the TIA 102 at a time.

When light is incident on one of the photodetector 103*a* to 103*d*, the TIA 102 receives electrical current from the photodetector when that photodetector is connected to the TIA 102, and converts the received electrical current into an amplified electrical voltage. The TIA 102 may be implemented, for example, using one or more operational amplifiers.

The signal detector 104 receives the amplified voltage from the TIA 102 and extracts a LiFi signal therefrom. The signal detector 104 may be implemented, for example, as a radiofrequency (RF) detector with an RSSI module that receives the LiFi signal and determines a signal strength of the LiFi signal. The signal detector 104 is arranged to provide the determined signal strength to the controller 105. The RSSI module of the signal detector 104 may be implemented, for example, as a comparator which is arranged to compare a signal strength of the received LiFi signal to a threshold signal strength and output to the controller 105 an indication of whether the LiFi signal strength is above the threshold signal strength or below the threshold signal strength.

In another example, an analogue-to-digital (AD) converter in the controller 105 may be used as a comparator to determine and compare the signal strength of the LiFi signal with a threshold signal strength in place of the RSSI module of the signal detector 104.

It is appreciated that when receiving a data packet, the baseband circuit 106 is used to detect and synchronize the packet by analyzing the beginning of the packet. The term "signal strength" as used herein may therefore refer to the received signal strength (RSSI) as established for the part of the frequency band where desired packet portions (e.g. preambles) are present.

Thus, in the first example, a single TIA 102 and a single signal detector 104 can be used (instead of using one per phase detector).

Optionally it may be possible to implement two parallel signal paths, i.e., one for configuration of the transceiver in accordance with the proposed handover control mechanism and one which sums up all contributions from all photodetectors 103a to 103d, having a separate TIA (not shown in FIG. 5), that is used for synchronization of the system. Although such a solution comes at the price of a further TIA and, by summing, may suffer from a higher noise floor during synchronization, it does enable the transceiver to perform synchronization using the entire preamble in parallel to the configuration of the transceiver.

Figure 6:
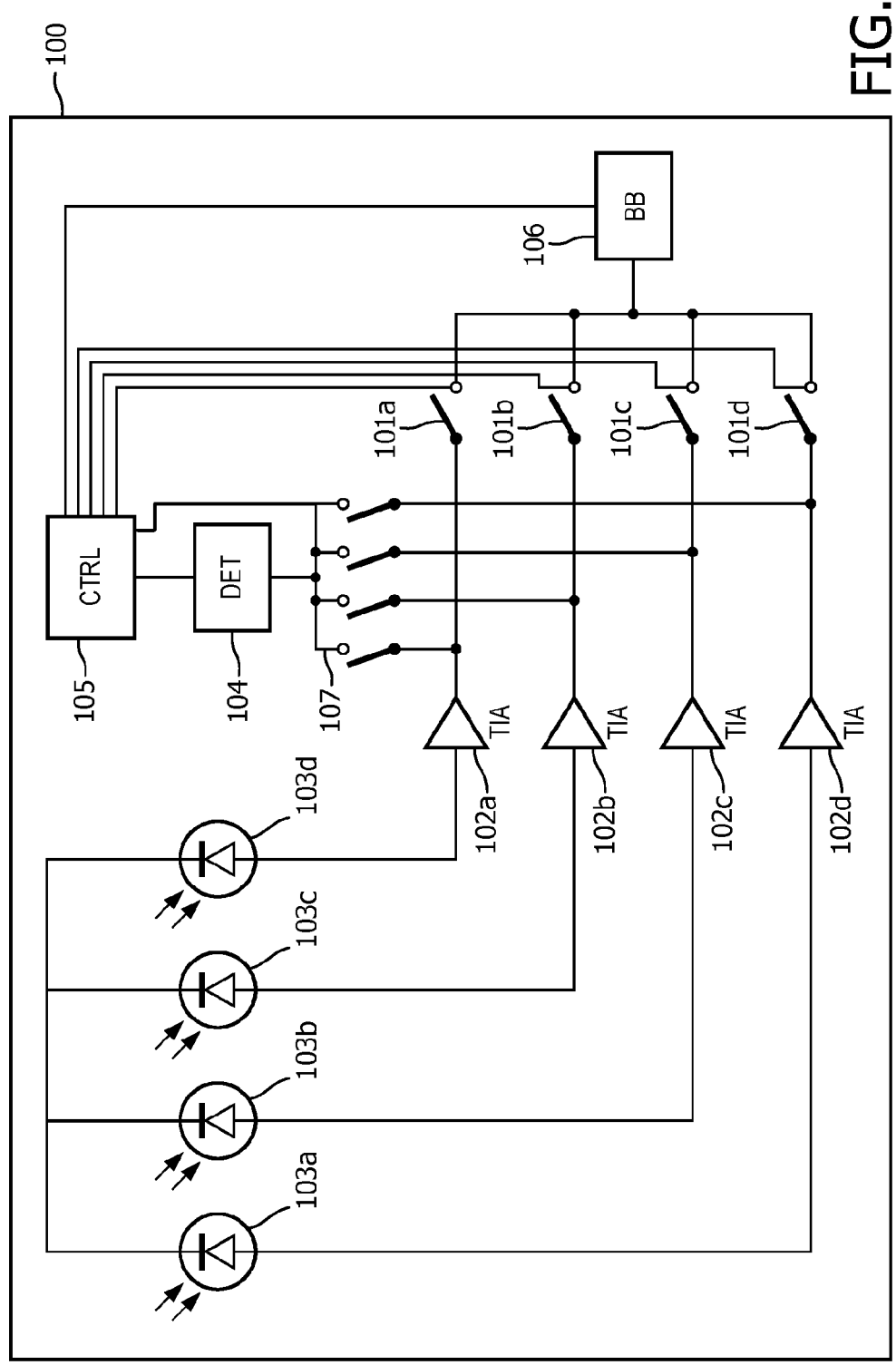
FIG. 6 shows schematically a block diagram of a second example of a sectorized receiver with handover control function according to various embodiments.

FIG. 6 shows schematically a block diagram of a second example of a sectorized receiver 100 with handover control function according to various embodiments. The second example provides an alternative configuration with reduced complexity by providing four TIAs 102a to 102d, each connected to a respective one of the photodetectors 103a to 103d, and a single signal detector 104 with four additional switches 107 connected between respective outputs of the TIAs 102a to 102d and an input of the signal detector 104 and controlled by the controller 105 to successively measure the incoming signal in all phasedetectors 103a to 103d without interfering with the signal being guided via a closed on of the switches 101a to 101d to the baseband circuit 106.

Figure 7:
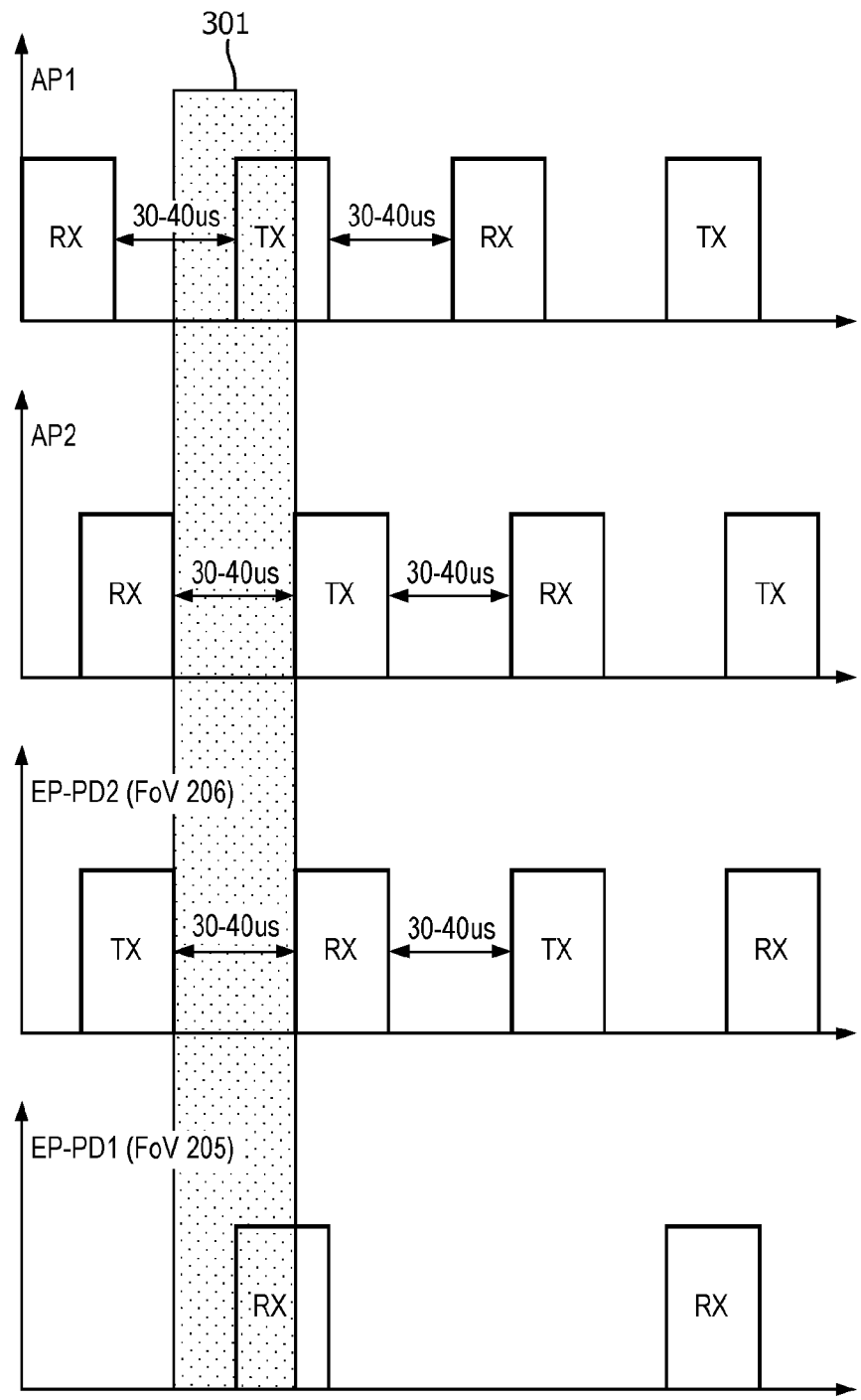
FIG. 7 shows schematically four time diagrams with examples of signal waveforms during a communication between a sectorized EP and two unsynchronized APs.

FIG. 7 shows schematically four time diagrams with examples of signal waveforms during a communication between the sectorized EP 209 and two unsynchronized APs (AP1 201 and AP2 202) in the system of FIG. 2.

The uppermost diagram indicates reception times (RX) and transmission times (TX) of AP1, while the second diagram indicates reception times (RX) and transmission times (TX) of AP2. The third diagram indicates transmission times (TX) of the EP 209 and reception times (RX) of the EP 209 via its second phasedetector (PD2) having the second FoV 206. Finally, the lowermost diagram indicates reception times (RX) of the EP 209 via its first phasedetector (PD1) having the first FoV 205.

As can be gathered from FIG. 7, all transmission times and reception times are separated by a transmission interruption time (e.g. Inter-frame gap of about 30-40 us). In the example of FIG. 7, the EP 209 is connected to AP2 202 via the second phasedetector (PD2) having the second FoV 206 of the sectorized receiver 100. This can be derived from the fact that the reception time (RX) of the EP 209 substantially corresponds to the transmission time (TX) of the AP2 202 and vice versa.

When the EP 209 starts moving farther away from AP2 202 and closer to AP1 101, the signal strength measured during the transmission interruption time 301 (e.g. inter-frame gap of about 30-40 us) of the EP 209 and received in the first FoV 205 (see grey area in the lowermost diagram) will exceed a threshold for its corresponding phasedetector (i.e. the first phasedetector (PD1) in this case), and the controller can switch off a connection to the second phasedetector (PD2) with FoV 206 and switch on a connection to the first phasedetector (PD1) with the first FoV 205 until the EP 209 registers with AP1.

As the frame size on optical wireless communication (e.g. ITU-T g.hn or g.vlc or IEEE 802.11 networks) is variable, even if two neighboring APs start synchronized by chance, when an EP registers to one of them, the APs will become unsynchronized eventually after a few frames and a portion of the transmission interval of a beacon of the non-connected AP will fall into the inter-frame gap of the EP and can be measured by the signal detector of the EP.

In embodiments, the transmitter circuit of the transceiver of an EP my comprise a plurality of light sources for outputting modulated light signals. The light sources may be implemented, for example, as light emitting diodes LEDs, e.g. visible light or infrared LEDs. Each light source may be in an active state (turned ON) or an inactive state (turned OFF). In the active state, the light source is arranged to output light for the purposes of transmitting optical wireless communication signals. In the inactive state, the light source is arranged to not output light.

Each light source emits light into a different respective transmission FoV. For example, each light source may transmit light into a specific sector (over a solid angle) and may be oriented in a different direction from the other light sources. Alternatively or additionally, the light output of one or more of the light sources may be constrained by part of the body or housing of the transceiver. In either case, there may or may not be overlap between the transmission FoVs of each of the light sources.

In examples, each of the reception FoVs of the photodetectors of the sectorized receiver of an EP may be associated with a corresponding one or more of transmission FoVs of light sources (e.g. LEDs or laser diodes) of a sectorized transmitter provided in the transceiver of the EP. In this regard, the reception FoV may be regarded as corresponding to a transmission FoV if for example the respective FoVs are identical or similar. For example, in the case that the respective FoVs are cone-shaped, the FoVs may be regarded as corresponding to each other if the respective cone angles are the same preferably within say 10%, or more preferably within 1 or 2%.

In some examples, the photodetectors and light sources may be provided as logical pairs, which receive from and transmit to the same or substantially the same FoV, respectively. The transmission FoV of a light source is considered to correspond to the reception FoV of the photodiode of the same logical pair. Further, the reception FoV may be regarded as corresponding to a transmission FoV if, for example, the reception FoV falls entirely within the transmission FoV or vice versa.

Furthermore, in examples, it may not always be necessary or appropriate to transmit a signal using all of the light sources of the transmitter. For example, in order for the transceiver implemented at an EP to transmit an optical wireless communication signal to an AP, a single light source may be sufficient. This may be the case, for example, when the AP is only located within the transmission FoV of a single light source.

In embodiments, the transceiver may be configured to determine one or more of the light sources to activate for transmitting modulated light signals. Because not all the light sources need to be activated, savings are made with regard to both power consumption and heat production. The determination of which one or more light sources to activate may be performed during reception of a preamble of a data packet, and for example not during reception of a data portion. In this manner, the input to a demodulator at the baseband circuit can be kept substantially constant during the processing of the data portion. This ensures proper reception and decoding of a received OWC data signal.

In embodiments, if a tested photodetector is determined to have received an optical signal with a signal strength above a predetermined threshold signal strength, a corresponding at least one light source may be activated, the corresponding light source having a transmission FoV which corresponds to the reception FoV of the tested photodetector.

In embodiments, the photodetector testing phase may be implemented in a variety of different ways. In practice, it may take around 2.5 us to test a photodetector. For example, with reference to FIG. 5 or 6, the signal detector 104 may take around 1 us to measure the signal, and determination of whether the signal strength is above the threshold may take another 1.5 us. If the inter-frame gap has a length of about 30 to 40 us, a sufficient number of photodetectors could be tested, while leaving enough time for synchronization after handover.

In some example, the controller may be configured to test all the photodetectors in sequence during the inter-frame gap. Optionally when the network protocol allows, the inter-frame gap may be configured to be longer than strictly required to account for synchronization issues. The controller may stop testing the photodetectors once a photodetector has been found that has a signal strength above the threshold. The sequence may for example be a predetermined sequence in which the photodetectors are tested in the same order each time, or a random sequence in which the photodetectors are tested in a random order each time.

The above examples describe ways in which the photodetectors of a sectorized receiver can be tested during the inter-frame gap. While the controller may be configured to test the photodetectors (in any manner described above) during a transmission interruption phase, this may not be necessary. For example, the device may not have moved from one transmission FoV to another. Hence, in examples, the controller may normally operate in a mode in which the controller does not test photodetectors, but switches to a "testing" mode in which it does test one or more photodetectors to determine a handover option. In other words, the controller may continue using a previously determined photodetector to receive LiFi signals until it switches to the testing mode in order to reassess which photodetector to use.

In some examples, the controller may be configured to switch to the testing mode according to a predefined timescale, e.g. once a second, once every ten seconds, once a minute, etc.

Alternatively or additionally, the controller may be configured to switch to the testing mode in response to input from a sensor.

In one example, the sensor may be a motion sensor (e.g. a gyroscopic sensor) indicating that the device itself with the controller has moved, rotated, etc.

In yet another example, the sensor may be implemented as an infrastructural occupancy/motion sensor, e.g. from the lighting infrastructure. Such a sensor may be used to track motion of a user within the environment. Input from this sensor (indicating presence of a user, or that the user has moved) can then be used as a trigger for the controller of the sectorized receiver to switch to the testing mode. This has advantages when the EP is held by the user and therefore motion of the user implies motion of the EP.

In some examples, the controller of the sectorized receiver may be configured to test the photodetectors according to any example described herein, but starting with a previously-determined one of the photodetectors first. That is, when the controller has previously selected a photodetector to use based on identifying a photodetector which received the highest signal strength, it may be configured to begin, as part of the next testing phase, by testing that photodetector before testing the other photodetectors. This is particularly advantageous because if the other device has not moved, then the first photodetector tested can be expected to be above the threshold and therefore be selected more quickly.

As will be appreciated, although the images presented herein are two-dimensional, actual systems will be operating in three-dimensional space. As a result, photodetectors and their respective FoVs, generally will be adjacent in three-dimensional space. For example, when four photodetectors are placed in a square layout, such as shown in FIG. 2, in a configuration intended to provide a combined larger coverage areas/solid angle than that of the individual photodetectors, their respective FoVs will be adjacent and may partially overlap.

To summarize, in optical wireless communication networks (e.g. LiFi networks), comprised of multiple APs, a mechanism is provided for seamless handover between two overlapped neighboring APs, wherein a sectorized EP is configured to exploit time division multiplexing characteristics to detect the presence of neighboring AP(s) and select a relevant segment for handover.

It will be understood that the controller referred to herein may in practice be provided by an integrated circuit or plural integrated circuits, an application-specific integrated circuit (ASIC), field-programmable gate array (FPGA), digital signal processor (DSP), etc.

Although at least some aspects of the embodiments described herein with reference to the drawings comprise computer processes performed in a controller, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

While the invention has been illustrated and described in detail in the drawings and foregoing description, such illustration and description are to be considered illustrative or exemplary and not restrictive. The invention is not limited to the disclosed LiFi-based embodiments but may be applied to all kinds of optical wireless networks with time multiplexed transmission schemes that involve transmission interruption times.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIG. 3 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An End Point, EP, device for use in an Optical Wireless Communication, OWC, network, comprising an Access Point, AP, device and wherein the EP device, is associated with the AP device, the EP device comprising:
    an optical wireless transceiver comprising a plurality of photodetectors having different respective fields of view for reception of modulated light signals, and
    an apparatus for controlling the optical wireless transceiver,
    wherein the apparatus is configured to:
    test one or more of the plurality of photodetectors to determine whether one of the plurality of photodetectors is receiving a modulated light signal with a signal strength above a threshold signal strength;
    detect a transmission interruption time being a time interval in the OWC network wherein the AP device and one or more of a plurality of other EP devices associated to that AP device are not transmitting, wherein the one or more of the plurality of other EP devices are different from the EP device, and wherein the apparatus is configured to detect the transmission interruption time based on a control output used to signal to a front-end stage of the transceiver when a transmitting circuit is transmitting; and
    if, during the transmission interruption time, the tested photodetector is determined to have received the modulated light signal with a signal strength above the threshold signal strength, switch reception to the tested photodetector and initiate a handover from the AP device to a further AP device, wherein the further AP device is different from the AP device.

2. The EP device of claim 1, wherein the transmission interruption time is determined by a networking protocol used by the optical wireless transceiver.

3. The EP device of claim 1, wherein the apparatus is configured to determine whether one of the plurality of photodetectors is receiving the modulated light signal with the signal strength above the threshold signal strength based on a measurement of a signal quality parameter during the transmission interruption interval.

4. The EP device of claim 1, wherein the apparatus is configured to switch reception to the tested photodetector while switching off other photodetectors of the plurality of photodetectors.

5. The EP device of claim 1, wherein the apparatus is configured to initiate the testing of the plurality of photodetectors in a predetermined or random sequence.

6. The EP device of claim 1, wherein the apparatus is configured to test the one or more of the plurality of photodetectors in response to an input from a motion sensor.

7. The EP device of claim 1, wherein the transmission interruption time is a time prescribed by the physical layer and/or Medium Access Control layer.

8. The EP device of claim 7, wherein the transmission interruption time is a channel turnaround time, subsequent to the EP device relinquishing channel access.

9. The EP device of claim 1, further comprising a signal detector configured to selectively receive output signals from the plurality of photodetectors via a plurality of switches for performing signal strength and/or quality measurements based on the received output signals.

10. The EP device of claim 9, wherein the plurality of switches are configured to be selectively controllable to switch reception to the tested photodetector.

11. An OWC system comprising at least one EP device of claim 1.

12. A method of controlling an optical wireless transceiver of an End Point, EP device for use in an Optical Wireless Communication, OWC, network, comprising an Access Point, AP, device, and wherein the EP device is associated with the AP device, the optical wireless transceiver comprising a plurality of photodetectors having a different, respective, fields of view for reception of modulated light signals,
    wherein the method comprises:
        testing one or more of the plurality of photodetectors to determine whether one of the plurality of photodetectors is receiving a modulated light signal with a signal strength above a threshold signal strength,
        detecting a transmission interruption time being a time interval in the OWC network cell wherein the AP device and one or more of a plurality of other EP devices associated to that AP device are not transmitting, wherein the one or more of the plurality of other EP devices are different from the EP device, and wherein the apparatus is configured to detect the transmission interruption time based on a control output used to signal to a front-end stage of the transceiver when a transmitting circuit is transmitting; and
        if, during the transmission interruption time, a tested photodetector is determined to have received the modulated light signal with the signal strength above the threshold signal strength, switching reception to the tested photodetector and initiate a handover from the AP device to a further AP device, wherein the further AP device is different from the AP device.

13. The method of claim 12, wherein the transmission interruption time is determined by a networking protocol used by the optical wireless transceiver.

14. The method of claim 12, wherein the testing comprises operating a switch arrangement to selectively connect each of the plurality of photodetectors to a signal strength detector.

15. An End Point, EP, device for use in an Optical Wireless Communication, OWC, network, comprising an Access Point, AP, device and wherein the EP device, is associated with the AP device, the EP device comprising:
    an optical wireless transceiver comprising a plurality of photodetectors having different respective fields of view for reception of modulated light signals, and an apparatus for controlling the optical wireless transceiver, wherein the apparatus is configured to:

test one or more of the plurality of photodetectors to determine whether one of the plurality of photodetectors is receiving a modulated light signal with a signal strength above a threshold signal strength, wherein the apparatus is configured to test the one or more of the plurality of photodetectors in response to an input from a motion sensor;

detect a transmission interruption time being a time interval in the OWC network wherein the AP device and one or more of a plurality of other EP devices associated to that AP device are not transmitting, wherein the one or more of the plurality of other EP devices are different from the EP device; and if, during the transmission interruption time, the tested photodetector is determined to have received the modulated light signal with a signal strength above the threshold signal strength, switch reception to the tested photodetector and initiate a handover from the AP device to a further AP device, wherein the further AP device is different from the AP device.

16. The EP device of claim 15, wherein the transmission interruption time is determined by a networking protocol used by the optical wireless transceiver.

17. The EP device of claim 15, wherein the apparatus is configured to determine whether one of the plurality of photodetectors is receiving the modulated light signal with the signal strength above the threshold signal strength based on a measurement of a signal quality parameter during the transmission interruption interval.

18. The EP device of claim 15, wherein the apparatus is configured to switch reception to the tested photodetector while switching off other photodetectors of the plurality of photodetectors.

19. The EP device of claim 15, wherein the apparatus is configured to initiate the testing of the plurality of photodetectors in a predetermined or random sequence.

20. The EP device of claim 15, wherein the apparatus is configured to detect the transmission interruption time based on a control output used to signal to a front-end stage of the transceiver when a transmitting circuit is transmitting.

* * * * *